US010212154B2

(12) United States Patent
Hallenborg (10) Patent No.: US 10,212,154 B2
(45) Date of Patent: Feb. 19, 2019

(54) METHOD AND SYSTEM FOR AUTHENTICATING A USER (71) Applicant: IDENTITRADE AB, Stockholm (SE)

(72) Inventor: Philip Hallenborg, Djursholm (SE)

(73) Assignee: IDENTITRADE AB, Stockholm (SE)

(*) Notice: Subject to any disclaimer, the term of this patent is extended or adjusted under 35 U.S.C. 154(b) by 202 days.

(21) Appl. No.: 15/502,281

(22) PCT Filed: Jul. 31, 2015

(86) PCT No.: PCT/SE2015/050840
§ 371 (c)(1),
(2) Date: Feb. 7, 2017

(87) PCT Pub. No.: WO2016/022057
PCT Pub. Date: Feb. 11, 2016

(65) Prior Publication Data
US 2017/0230351 A1 Aug. 10, 2017

(30) Foreign Application Priority Data

Aug. 8, 2014 (SE) ...................................... 1450927

(51) Int. Cl.
*H04L 29/06* (2006.01)
*H04L 29/08* (2006.01)
(Continued)

(52) U.S. Cl.
CPC ............ *H04L 63/083* (2013.01); *G06F 21/31* (2013.01); *H04L 9/321* (2013.01); *H04L 63/08* (2013.01);
(Continued)

(58) Field of Classification Search
CPC ........................... H04L 63/0876; H04L 67/02
(Continued)

(56) References Cited

U.S. PATENT DOCUMENTS 7,137,006 B1 * 11/2006 Grandcolas ............. G06F 21/41
713/180
7,533,802 B1 * 5/2009 McGinley ............... G07F 19/20
235/376
(Continued)

FOREIGN PATENT DOCUMENTS

EP         2194482 A1     6/2010
EP         2381385 A1    10/2011
WO      2014093613 A1     6/2014

OTHER PUBLICATIONS

Extended European Search Report from corresponding European Application No. 15830581.3, dated Jun. 20, 2017.
(Continued)

*Primary Examiner* — Haresh N Patel
(74) *Attorney, Agent, or Firm* — Tucker Ellis LLP (57) ABSTRACT Method for authenticating a user, comprising the steps of a) providing a central server (101), in communication with at least two authentication service providers (110,120,130) and at least one user service provider (150); b) associating each authentication service provider with at least one respective available level of authentication; c) receiving a request from the user service provider to authenticate a particular user accessing the user service provider via an electronic device (170,180); d) identifying a minimum level of authentication; e) the central server identifying a selected one (110) of said authentication service providers; f) either providing user credential data directly to the selected authentication service provider, without said user credential data being supplied to the central server, or determining that the selected authentication service provider has an active authentication session for the particular user; and g) causing the selected authentication service provider to authenticate the particular user and to provide an authentication response. The invention also relates to a system.

17 Claims, 6 Drawing Sheets (51) Int. Cl.
*H04W 12/06* (2009.01)
*H04L 9/32* (2006.01)
*H04W 12/08* (2009.01)
*G06F 21/31* (2013.01)

(52) U.S. Cl.
CPC ...... *H04L 63/0853* (2013.01); *H04L 63/0876* (2013.01); *H04L 63/101* (2013.01); *H04L 63/105* (2013.01); *H04L 63/205* (2013.01); *H04W 12/06* (2013.01); *H04W 12/08* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 7,578,436 | B1* | 8/2009 | Kiliccote | G06F 21/606 235/375 |
| 7,716,467 | B1* | 5/2010 | Deffet | H04L 63/0471 713/153 |
| 8,121,874 | B1* | 2/2012 | Guheen | G06Q 10/063 705/28 |
| 8,403,205 | B1* | 3/2013 | Billett | G07F 19/20 235/379 |
| 8,413,890 | B1* | 4/2013 | Billett | G07F 19/20 235/379 |
| 2002/0026328 | A1* | 2/2002 | Westerkamp | G06F 19/328 705/2 |
| 2002/0172345 | A1* | 11/2002 | Wu | H04M 3/42229 379/220.01 |
| 2003/0028782 | A1* | 2/2003 | Grundfest | G06Q 10/10 713/182 |
| 2003/0131244 | A1* | 7/2003 | Buoncristiani | H04L 63/0823 713/176 |
| 2003/0149781 | A1 | 8/2003 | Yared | |
| 2004/0030603 | A1* | 2/2004 | Grundfest | G06Q 10/10 705/26.1 |
| 2005/0010756 | A1* | 1/2005 | Clerc | G06F 21/33 713/155 |
| 2005/0138065 | A1* | 6/2005 | Ciriza | G06Q 10/10 713/176 |
| 2006/0010203 | A1* | 1/2006 | Mrsic-Flogel | H04N 21/4126 709/205 |
| 2006/0010251 | A1* | 1/2006 | Mrsic-Flogel | H04L 12/1822 709/245 |
| 2006/0200814 | A1* | 9/2006 | Kontinen | G06F 8/61 717/168 |
| 2007/0150357 | A1* | 6/2007 | Shin | G06Q 30/02 705/14.14 |
| 2007/0254630 | A1* | 11/2007 | Moloney | H04L 63/06 455/410 |
| 2008/0072037 | A1* | 3/2008 | Narayanan | H04L 9/3215 713/156 |
| 2008/0166995 | A1* | 7/2008 | Sun | G06Q 20/085 455/406 |
| 2008/0248784 | A1* | 10/2008 | Pan | H04M 3/42008 455/414.1 |
| 2008/0282182 | A1* | 11/2008 | Oosaka | H04L 12/2803 715/772 |
| 2009/0156209 | A1* | 6/2009 | Franklin | H04L 12/5692 455/435.2 |
| 2009/0288138 | A1* | 11/2009 | Kalofonos | H04L 9/3073 726/2 |
| 2010/0017608 | A1* | 1/2010 | Larsen | H04L 41/12 713/168 |
| 2010/0138900 | A1* | 6/2010 | Peterka | H04L 12/2812 726/4 |
| 2010/0242092 | A1 | 9/2010 | Harris | |
| 2011/0055585 | A1* | 3/2011 | Lee | H04L 9/0844 713/183 |
| 2011/0124315 | A1* | 5/2011 | LaFreniere | H04M 3/382 455/410 |
| 2012/0266209 | A1* | 10/2012 | Gooding | H04L 63/20 726/1 |
| 2012/0297200 | A1* | 11/2012 | Thom | G06F 21/57 713/189 |
| 2012/0324545 | A1* | 12/2012 | Hamid | H04L 63/0853 726/4 |
| 2013/0083805 | A1* | 4/2013 | Lu | H04L 12/2807 370/401 |
| 2013/0145449 | A1* | 6/2013 | Busser | G06F 21/31 726/7 |
| 2013/0179500 | A1* | 7/2013 | Kacin | H04L 63/20 709/204 |
| 2013/0268129 | A1* | 10/2013 | Fadell | G06Q 10/20 700/278 |
| 2014/0068266 | A1* | 3/2014 | Cismas | H04L 9/321 713/171 |
| 2014/0143433 | A1* | 5/2014 | Siegal | H04L 65/1016 709/228 |
| 2014/0164776 | A1* | 6/2014 | Hook | H04L 9/14 713/171 |
| 2014/0230018 | A1* | 8/2014 | Anantharaman | H04L 63/0861 726/4 |
| 2014/0245417 | A1* | 8/2014 | Hu | H04L 63/0807 726/7 |
| 2014/0337260 | A1* | 11/2014 | Narasimha | G06Q 30/0201 706/14 |
| 2014/0359692 | A1* | 12/2014 | Chari | H04L 63/20 726/1 |
| 2014/0373099 | A1* | 12/2014 | Durbha | H04L 63/10 726/4 |
| 2015/0146567 | A1* | 5/2015 | Ylimartimo | H04L 63/0272 370/254 |
| 2015/0180868 | A1* | 6/2015 | Sng | H04L 63/0884 726/9 |

OTHER PUBLICATIONS

Wikipedia: "Transport Layer Security", Dec. 31, 2013, pp. 1-35 [retrieved on Jun. 9, 2017].
International Search Report from corresponding International Patent Application No. PCT/SE2015/050840, dated Nov. 9, 2015.
International Preliminary Report on Patentability from corresponding International Patent Application No. PCT/SE2015/050840, dated Nov. 29, 2016.
The Oauth 2.0 Authentication Framework, IETF, RFC 6749, Oct. 2012.

* cited by examiner

METHOD AND SYSTEM FOR AUTHENTICATING A USER

The present invention relates to a method and a system for authenticating a user. In particular, the invention relates to remote authentication of a user, via an electronic device operated by the user.

In many circumstances a user needs to be remotely authenticated, in order for a remotely arranged party to verify the identity of a user contacting the remotely arranged party. In particular, this is the case in digital communication applications, especially online. For instance, within the fields of e-commerce, online transactions and banking, digital service provision and user account registration, a user contacting a central server over the internet needs to be authenticated by providing some type of proof of his or her identity.

There are many conventional technologies for providing such authentication, ranging from less secure alternatives such as simply entering a user name and a password, via more elaborate techniques such as Public Key Infrastructure-based systems, to multi-factor authentication solutions involving SMS (Short Message Service) messages sent to a mobile phone controlled by the user, or even biometric measurement data, and so on.

There is a problem in that it is costly for a user service provider to provide such authentication procedures. In general, in order to provide adequate security and user convenience, complex or different authentication methods should also in many cases be provided. Especially for small user service providers, this can represent a significant implementation cost.

Another problem is that it is difficult for individual users to keep track of various authentication tools, login credentials, etc., for use with different user service providers.

One known solution to these problems is to allow a third party, such as a large, well-known company, to authenticate a user on behalf of the user service provider. Examples include the so called OpenID initiative, in turn using the open authentication standard Oauth, using which an authenticating party can provide an access token, using which the proprietor of said access token can obtain access to a defined subset of services provided by the authenticating party. Another example is Facebook (registered trademark) Connect.

However, such conventional methods often impose specific requirements on the user, such as first signing up for an account with a particular authentication service provider. For service providers, there is a desire for increased flexibility and possibility to tailor the authentication type to each particular authentication need, such as depending on the type of service provided or the type of electronic device used by the user. Also, there is a desire for an authentication service which can be acquired at a lower cost.

A related problem is that it is desired for users not to have to enter personal information, such as billing address, repeatedly when ordering transactions with various service providers. Also, many user service providers, such as online vendors, have a desire to obtain more detailed user information as early as possible during the ordering procedure of a transactions, such as a purchase.

Another problem is to provide a simple and efficient way of allowing authentication service providers to authenticate users across borders, in which case access to agreements and the operation under different legislations may impose significant cost to small-scale user service providers.

The present invention solves the above described problem.

Hence, the invention relates to a method for authenticating a user, which method characterised in that the method comprises the steps of a) providing a central server, in communication with at least two authentication service providers and at least one user service provider; b) associating each authentication service provider with at least one respective available level of authentication; c) receiving, at the central server, a request from the user service provider to authenticate a particular user accessing the user service provider via an electronic device; d) identifying a minimum level of authentication to use for the said request; e) causing the central server to identify a selected one of said authentication service providers which is associated with at least one allowable level of authentication which is at least as high as the said minimum level of authentication, and which selected authentication service provider is capable of authenticating said particular user at said allowable level of authentication; f) either providing user credential data associated with said particular user directly to the selected authentication service provider, without said user credential data being supplied to the central server, or determining that the selected authentication service provider has an active authentication session for the particular user; and g) causing the selected authentication service provider to authenticate the particular user and to provide an authentication response.

Furthermore, the invention relates to a system for authenticating a user, wherein the system comprises a central server, in communication with at least two authentication service providers and at least one user service provider, wherein the system further comprises a database comprising respective associations between each authentication service provider and at least one respective available level of authentication, which system is characterised in that the central server is arranged to receive a request from the user service provider to authenticate a particular user accessing the user service provider via an electronic device, to identify a minimum level of authentication to use for the said request and to identify a selected one of said authentication service providers which is associated with at least one allowable level of authentication which is at least as high as the said minimum level of authentication, and which selected authentication service provider is capable of authenticating said particular user at said allowable level of authentication, in that the system is arranged to thereafter either provide user credential data associated with said particular user directly from the user service provider to the selected authentication service provider, without said user credential data being supplied to the central server, or to determine that the selected authentication service provider has an active authentication session for the particular user, and in that the system is arranged to cause the selected authentication service provider to authenticate the particular user and to provide an authentication response to the user service provider.

In the following, the invention will be described in closer detail, partly with reference to the enclosed drawings, in which.

All figures share reference numerals for the same parts.

Figure 1:
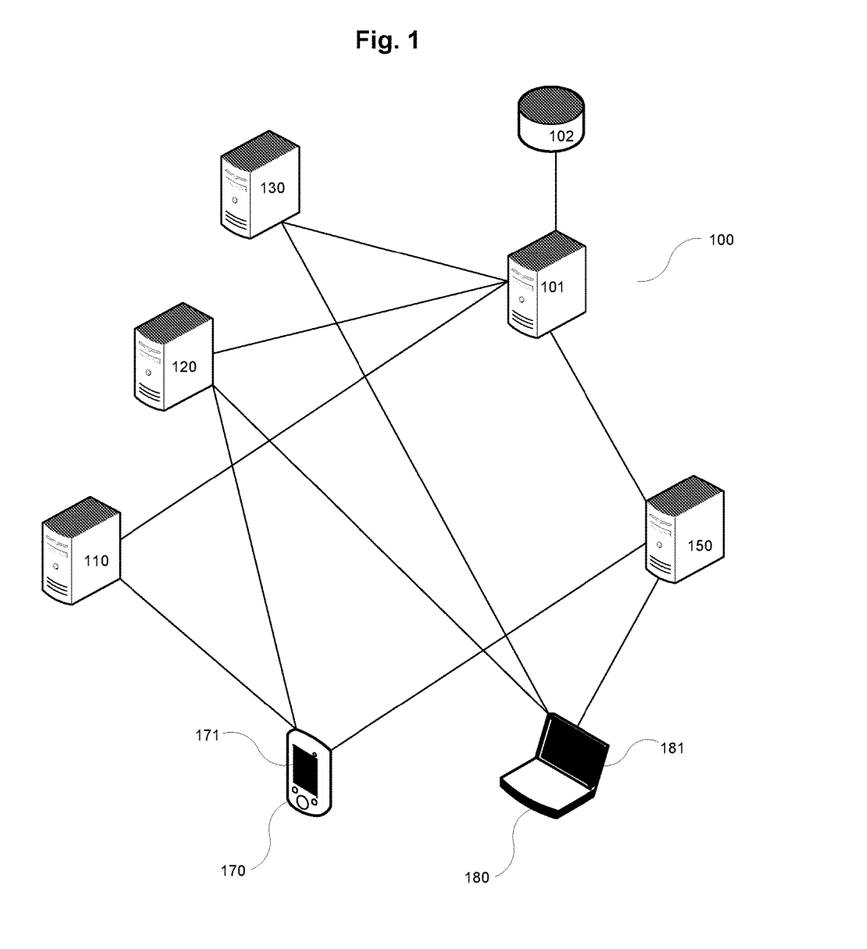
FIG. 1 is an overview diagram of a system according to the present invention and arranged to perform a method according to the invention.

FIG. 1 shows a system 100 according to the present invention for authenticating a user via an electronic device 170, 180. The system 100 is furthermore arranged to perform the methods described herein according to various aspects of the present invention.

In one aspect of the invention, the system 100 comprises a central server 101, comprising or in communication with a database 102; at least one, preferably at least two, preferably a plurality of user service providers 150 (only one shown in FIG. 1); and at least one, preferably at least two, preferably a plurality of authentication service providers 110, 120, 130. In another aspect of the invention, the system 100 only comprises the central server 101, the database 102 and any software provided by the central server 101 to connected authentication service providers 110, 120, 130 and user service providers 150, which are as such thus not part of the system 100.

The database 102 comprises information regarding registered authentication service providers 110, 120, 130, user service providers 150 and users, such as required minimum allowed authentication levels for various conditions.

The user service provider 150 may be any type of party capable of providing services to users remotely, such as online vendors; public service actors such as libraries, government institutions or the like; financial institutions, such as online banks; payment providers; online communities; communication services; or any other actor providing a service to users remotely in a way so that the identity of the user is needed in order to provide at least one of the services provided. It is preferred that users communicate with the service provider 150 directly over a digital communications network such as the internet. In the following, when the term "internet" is used, it is understood that any type of digital communications network may be used, as applicable, such as wired or wireless local area or wide area networks.

The authentication service providers 110, 120, 130 may, furthermore, be any type of party capable of providing authentication services to users remotely, and in particular arranged to perform authentication of users, such as online vendors; public service actors such as libraries, government institutions or the like; financial institutions, such as online banks; payment providers; online communities; communication services; or any other actor the relationship of which to each user requires that the identity of the user in question is safely established by a user authentication function provided by the authentication provider 110, 120, 130. It is preferred that the authentication providers 110, 120, 130 communicate directly with each respective user, over a digital communications network such as the Internet.

As used herein, the term "authentication service" means a remotely provided service for authenticating a user, comprising establishing with a certain minimum level of security a correct identity of the user. Such a minimum level of security, such as a minimum level of assurance (LOA), is herein denoted "authentication level". Examples of such authentication levels are those definitions of which are provided by NIST (National Institution of Standards and Technology, USA), according to which there are at least four basic levels of assurance levels, ranging from low security procedures where it is only tested whether it is the same user accessing a service at different occasions ("Level 1") up to high security procedures where authentication is dependent upon the user's possession of a strongly encrypted cryptographic key ("Level 4"). See www.nist.gov for further information. Herein, it is preferred that each authentication service provider 110, 120, 130 is unambiguously associated with one or several certain available well-defined authentication levels, the requirements of which the authentication service in question fulfills, and that each authentication service provider is associated with a certain respective minimum supported authentication level. It is possible that a particular authentication service provider is associated with different minimum authentication levels in relation to different users. It is preferred that this information is stored in the database 102 and accessible from the central server 101. The information may, for instance, be supplied in an initial registration step of each authentication service provider 110, 120, 130, and may subsequently be updated, for instance in reaction to new information in relation to specific users. It is also possible that available authentication levels in relation to a specific user are provided, by request from the central server 10 to one or several authentication service providers that have been identified as being available for authenticating the user in question (see below).

It is realized that each one of entities 101, 110, 120, 130, 150 may be implemented as a standalone, internet connected server; a distributed or virtual set of servers; or in any other configuration, as long as the entity in question provides a well-defined interface for communications to and from the entity.

Each user communicating with the system 100 uses an electronic device, which is preferably arranged to communicate with the system 100 over a digital communications network such as the internet. In FIG. 1, such devices are exemplified by a mobile phone 170 of so-called smartphone type and a portable computer 180. However, the electronic device can be any device capable of communicating with the system 100, such as a desktop computer or a machine-to-machine interface. It is preferred that the device 170, 180 is of general-purpose type, and it is also preferred that the device comprises a respective display 171, 181 capable of providing an interactive graphical user interface to the user.

The user is preferably a human being, but in some aspects the user may be a machine-implemented communication part in a machine-to-machine implemented system. In the latter case, the electronic device 170, 180 may be comprised in or constitute the machine in question.

Figure 2:
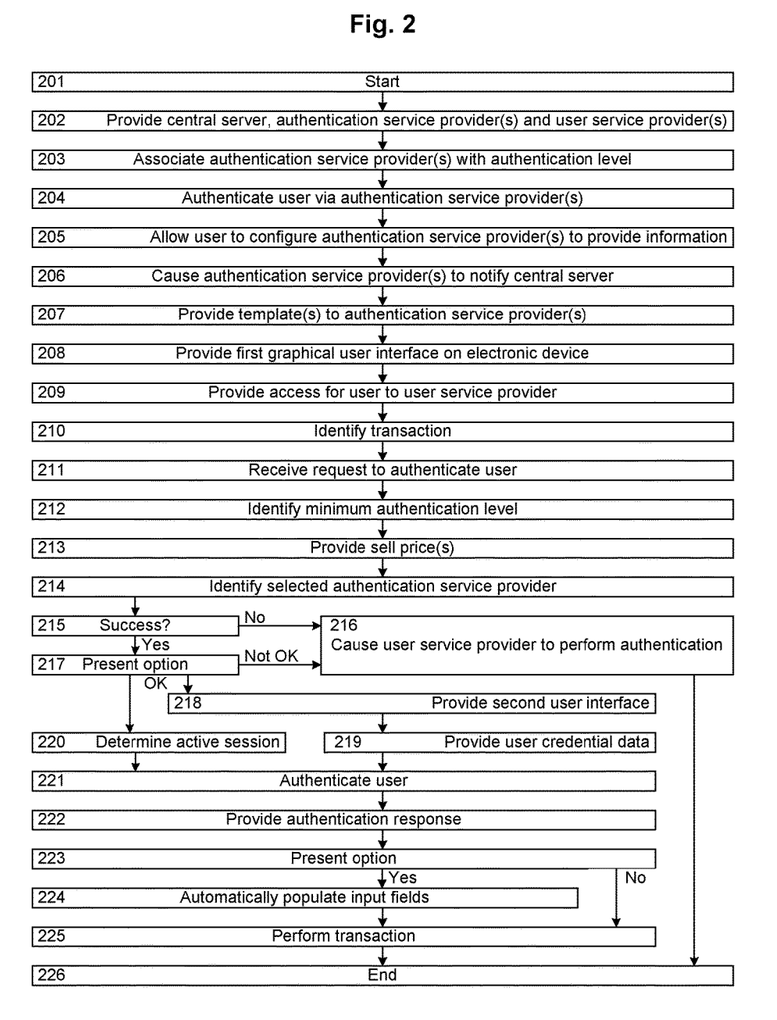
FIG. 2 is a flow chart depicting the various method steps of a method according to a first aspect of the present invention.

FIG. 2 shows a method according to a first aspect of the present invention for authenticating a user. In a step 201, the method starts.

In a step 202, the central server 101 is provided, and is arranged to be in communication with at least two authentication service providers 110, 120, 130 and at least one user service provider 150, that are also provided. It is realized that this step 202 can be performed in advance and only one time for several runs of the method.

In a step 203, each authentication service provider 110, 120, 130 is associated with at least one respective available level of authentication. Each particular provider 110, 120, 130 may be associated with several available such levels, in which case one of the available levels for a certain provider 110, 120, 130 is considered to be the lowest, or least safe, level. For instance, adding another identification factor, such as a physical token owned by the user, or adding encryption, would make the authentication level safer.

According to a preferred embodiment, in a step 204, which can be performed in advance of the existence of a need for the user service provider 150 to authenticate the user, the user is authenticated by a certain authentication service provider. This may, for instance, mean that the user successfully logs into a web page provided by the authentication service provider in question, or that the user in any other suitable manner provides proof, at a certain authentication level, of the identity of the user in question. It is preferred that such authentication in step 204 comprises the user providing some type of user credential data to the authentication service provider.

Herein, "credential data" is to be understood as all types of user-specific information that can be provided from a user via an electronic device and that can be used by an authenticating party to identify or prove the identity of the user in question, such as user name—password combinations; PIN codes; cryptographic keys; hash values; biometric data, such as fingerprint data; and so on.

In other words, after step 204, the authentication service provider in question holds information regarding the user, in particular user credential data allowing the authentication service provider to authenticate the user at a particular authentication level. This authentication may be performed in connection to the authentication service provider in question providing some type of service to the user. After the authentication in step 204, or an authentication in step 221 (see below), it is preferred that the authentication service provider has an active authentication session with respect to the authenticated user. This may mean that the user does not have to provide credential data when being authenticated again within a predetermined time period during which the said session is active. The time period may be defined by the authentication service provider.

Preferably, in a step 205, the authentication service provider in question, more preferably several, or all, of the authentication service providers 110, 120, 130, are caused to be remotely configurable by individual users so that they can provide information regarding their respective capability to authenticate the users in question to the central server 101. Hence, the user in question may remotely instruct the authentication service provider in question, preferably over the internet and preferably in connection to the authentication step 204, such as via a user control provided as an integrated part of a web page displayed as a result of a successful login with the authentication service provider in question, to, upon request from the central server 101 or automatically upon authentication of the user in question, provide information indicating that the authentication service provider in question is capable of authenticating the user at least at the said authentication level, and preferably also to provide, in a subsequent step 224, user information to the graphical user service interface (see below).

In particular, in a step 206, the, several or all authentication service providers 110, 120, 130 is or are arranged to notify the central server 101 when a user has been authenticated by the authentication service provider in question.

In a preferred step 207, which is preferably performed as an initial step in connection to setting up an association between the central server 101 and a certain authentication service provider 110, 120, 130, but which may be performed at any time before step 218, a respective template for a second interactive graphical user interface is provided to the or those authentication service providers that will use such templates, see below.

According to the said first aspect of the present invention, in a step 211, the central server 101 receives a request, from one 150 of said one or several user service providers, to authenticate a particular user accessing the user service provider 150 in question via an electronic device 170 or 180. This request can be provided in different ways.

As an example, the central server 101 may be directly provided, for instance from the user, with information indicating that the user wishes to be authenticated using a particular specified authentication service provider 110, 120 or 130, in turn providing an adequate authentication level for the present purposes. In another example, the user may be presented with a list of available authentication service providers with which the central server 101 is in communication and that can deliver an adequate authentication level, from which list the user can select a certain authentication service provider to use for a later authentication step 220.

However, FIG. 2 illustrates an alternative, preferred way, according to which the user first initiates contact with the user service provider 150, and it is the user service provider that in turn requests, possibly via an interface provided by the user service provider to the user, the central server 101 to authenticate the user. In general, and as will be explained in the following, the central server 101 may make the decision automatically as to what specific authentication service provider that will be used to authenticate the user.

Hence, in a preferred step 208, a first interactive graphical user interface is provided by the user service provider 150. For instance, the user service provider 150 comprises a web server providing a web page which is the first interface. In a step 209, the user is provided with remote access to the user service provider 150 via this first interface, displayed to the user on the display 171, 181 of the device 170, 180 used by the user, by the user service provider 150. For instance, the device 170, 180 may comprise a web browser arranged to read and display the first interface provided by the user service provider 150 web server.

In a preferred step 210, which may be performed at any time prior to step 225 but preferably is performed before step 211, a particular user service transaction is identified, which transaction is to be performed by the user service provider 150 for, to or on behalf of the user, and which requires the user to be authenticated before being performed.

Then, in step 211, the user service provider 150 requests the central server 101 to authenticate the user, in other words to provide an authentication service of the user. Preferably, the request comprises or implies a specific allowable authentication level, as dictated by the type of transaction and/or the particular user service provider 150 and/or the particular user or user category. The allowable authentication level is the minimal authentication level that is allowed for authentication of the user under the current conditions. The database 102 may comprise information regarding what types of transactions, particular user service providers and particular users and/or user categories that require what minimum authentication levels.

According to a preferred embodiment, the minimum allowable level of authentication used for each authentication service provider 110, 120, 130 is caused to depend on at least one of the collection of parameters consisting of type of the electronic device; type and/or provider of a graphical user interface via which the user accesses the user service provider; the access of the authentication service provider in question to information identifying the particular user; geographical location of the electronic device; and/or the existence of an active authentication session with the authentication service provider in question.

Figure 3:
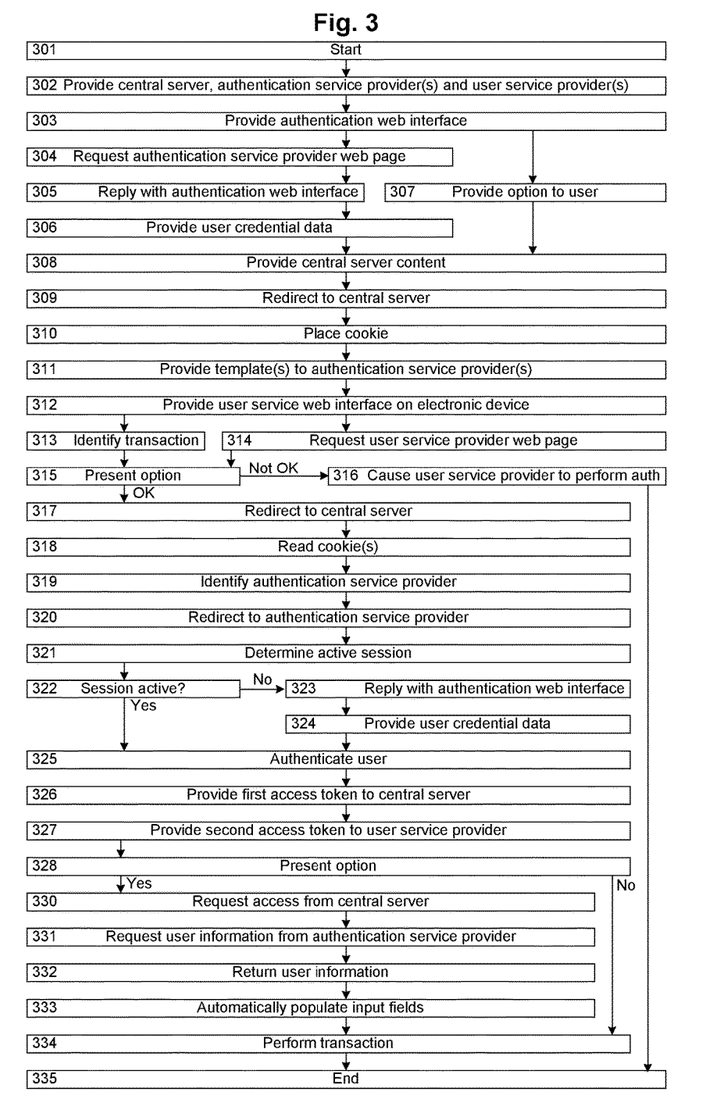
FIG. 3 is a flow chart depicting the various method steps of a method according to a second aspect of the present invention.

It is realized, as is illustrated in FIG. 3 (below), that the request in step 211 may also be performed in an indirect way by the service provider 150, via the first graphical interface.

The, the service provider 150 is not directly involved at the moment of the request, which is rather performed by for instance the device 170, 180 on behalf of the user service provider 150.

In a step 212 according to the said first aspect of the invention, it is determined, preferably by the central server 101 and preferably based upon the said available authentication-related information, an allowable authentication level to use for the said request, which level is required to authenticate the user under the current conditions.

In a step 214, the central server is arranged to identify a selected one of said authentication service providers 110, 120, 130 which is associated with at least one level of authentication which is at least as high as the allowable authentication level, and which authentication service provider is capable of authenticating the said particular user at the allowable authentication level.

According to a preferred step 213, preceding step 214, the central server 101 is however arranged to first identify, for several authentication service providers 110, 120, 130, a respective offered sell price for performing user authentication at the allowable level of authentication. For instance, the central server 101 may be arranged to request a respective sell price at which each respective authentication service provider is willing to perform the user authentication in question, preferably with knowledge of the particular user to be authenticated. Alternatively, the central server 101 has beforehand received price lists from several authentication service providers regarding various types of authentications.

Once the authentication service providers have responded to this request or the price list information has been analyzed, the central server 101 is arranged to identify at least one, preferably exactly one, authentication service provider offering a lowest sell price at the respective allowable level, and to use this authentication service provider as the said selected authentication service provider in the following.

According to one preferred embodiment, an auction over one or several bid rounds is performed among authentication service providers 110, 120, 130 being capable of providing at least the allowable authentication level, the final winner of which auction is the selected authentication service provider to use for the authentication in question.

It is also possible for the central server 101, via the user service provider 150 such as via the first graphical user interface, to allow the user to select what authentication service provider to use among a set of lowest-bidding authentication service providers.

In a preferred step 215, the central server 101 evaluates if at least one authentication service provider could be identified as the selected authentication service provider. For instance, none of the connected authentication service providers 110, 120, 130 may have been able to provide at least the allowable authentication level, or none may have been able to authenticate the particular user. If an authentication provider was identified in step 214, the method skips to step 217. Otherwise, it is preferred that the steps 217-225 are not performed, but the user service provider 150 is instead caused to authenticate, in a step 216, the particular user for the particular transaction in question without involving any of said authentication service providers 110, 120, 130. Preferably, this means that the user service provider 150 performs its own, conventional, default procedure for authenticating the user.

In a preferred step 217, the user is then presented, via a graphical user interface, preferably the above mentioned first graphical user interface on the display 171, 181, with an option whether or not to authenticate using one of the authenticating service providers 110, 120, 130. Preferably, it is not specified at this point to the user which of the authentication service providers that was identified in step 214. If the user does not choose to allow such authentication, the method again skips to step 216 rather than performing steps 218-225.

It is furthermore preferred that the option being presented in step 217 is comprised in the first interaction, relating to user authentication with regards to the transaction in question to be performed, between the user and the interactive graphical user interface provided to the user by the user service provider 150. Hence, it is preferred that the communications between the user service provider 150, the authentication service providers 110, 120, 130, and the central server 101 described above in relation to the previous steps are fully automatic, and do not require any user interaction. In other words, when for instance loading the checkout page from an online vendor being the user service provider 150 in question, a user control may be automatically included in the page which, when activated by the user, acknowledges that the user wishes to allow any one of the authentication service providers 110, 120, 130, or at least any one of said providers that the user has previously agreed to use, such as in a preferences setting supplied previously to the central server or by checking corresponding controls on the respective web page of each donor, to perform the user authentication for the purchase.

According to the said first aspect of the invention, thereafter either user credential data associated with the user in question is provided, in a step 219, directly to the selected authentication service provider, without the user credential data being supplied to the central server 101, or it is determined, in a step 220, that the selected authentication service provider already has an active authentication session for the user in question.

Hence, in step 219 or 220, the central server 101 acts as a pure intermediary, binding together the user service provider 150 with one of several available authentication service providers 110, 120, 130, without ever gaining actual knowledge of the specific credential information necessary for performing said authentication. Since the credential data is not provided to the central server 101, it is neither stored therein, nor in the database 102.

According to a preferred embodiment, the provision in step 219 is made possible by a step 218, in which the above mentioned first graphical user interface is arranged to in turn activate a second user interface. This second user interface is then arranged to allow the user in question to communicate directly with the selected authentication service provider, thereby to supply said user credential data to the selected authentication service provider without it passing via the central server 101.

According to one preferred embodiment, the second user interface is an interactive graphical user interface provided to the user on the display 171, 181 of the electronic device 170, 180, and via which the user can enter the credential data.

For instance, in this case the second graphical interface may be in the form of a locally installed or remotely accessed application which is activated by the first graphical interface, and to which the active view of the display 171, 181 is transferred upon such activation. However, according to a preferred embodiment the second graphical user interface is provided as an integrated graphical sub interface of the first graphical user interface, such as within a specific subpart, such as an iframe, provided within a web page comprised in the first graphical user interface. For instance, the second graphical interface may be embodied as a particular graphical field in the first interface, or a popup dialog launched by and from the first interface. In these and similar examples, the second interface will typically comprise user controls activatable for recording or entering, and providing, credential data specifically selected for authenticating the user in relation to the transaction to be performed.

In a particularly preferred embodiment, the second interface is populated with contents by the selected authentication service provider itself, after initiation by the user service provider 150. In case a relevant template was provided by the central server 101 to the selected authentication service provider in step 207, this template is preferably used as a basis for the population of the second interface with such user controls. For instance, a template for entering a user name and a password may comprise labels, user input fields for user name and password, as well as a field in which the authentication service provider can insert its logotype. Also, a link to a standardized set of terms and conditions can be provided as a part of the template, and so on. In general, it is preferred that the same template is provided to several authentication service providers, so that the user experience for the end user becomes as similar as possible when using different authentication service providers. Hence, in this case the selected authentication service provider provides the actual second graphical user interface to the user service provider 150, or preferably directly to the device 170, 180, for provision to the user in question as a part of the first graphical user interface, based upon said template.

According to another preferred embodiment, the second interface may be provided by specific software or hardware which is not part of the first graphical interface, but as initiated by the first graphical interface, such as activation of a fingerprint sensor on the device for reading the user's fingerprint and providing related data to the central server 101; activating a mobile telephony operator of the mobile phone of the user for sending an SMS (Short Message Service) to the mobile phone's telephone number (MSISDN), comprising an alphanumerical challenge to be manually provided to the user service provider by the user, or providing a request to the said mobile telephone to re-enter the SIM (Subscriber Identity Module) PIN code; activating a cryptographically based authentication procedure which is locally activatable on the electronic device; or the like.

As mentioned above, in the alternative step 220, it is determined that there is already an active authentication session involving the selected authentication service provider and the user in question, in which case the second interface is not presented but the method instead skips to step 221. For instance, the central server 101 may collect information regarding such an active authentication session, or the first interface may receive such information upon a request to the selected authentication service provider to provide the second interface.

Then, in a step 221 according to the present invention, the selected authentication service provider authenticates the particular user. In case credential data was supplied in step 219, the authentication comprises the selected authentication service provider verifying the credential data. In case an active session was determined to exist in step 220, the authentication comprises the selected authentication service provider verifying the said active authentication session, in which case steps 220 and 221 may be one and the same.

In a subsequent step 222, an authentication response is provided to the user service provider 150. This authentication response may be that no authentication was possible, for instance since the user did not supply correct credential data to the authentication service provider, or that the authentication was validly performed based upon the supplied user credential data or the fact that an active authentication session existed. It is preferred that the authentication response is provided from the selected authentication service provider to the user service provider 150 via the central server 101.

According to a preferred embodiment, the user service provider 150 is then provided with access, preferably from the selected authentication service provider and via the central server 101, to user information previously stored by the selected authentication service provider and therein associated with the particular user in question. According to an alternative embodiment, the said user information is provided directly from the authentication service providers (or several authentication service providers, see below) to the user service provider, by the central server providing a direct communication channel between the user service provider and the authentication service provider.

Herein, the term "user information" means any user metadata information, such as name, delivery and invoicing addresses, telephone numbers, credit card information, clothing sizes, contact lists, preferred configuration options, previous user behavior, etc., that is specific to the user in question. Such user metadata has preferably been provided by the user in question as a part of the interaction between the user and the selected authentication service provider in step 204, under the security provided by an active authentication session, for instance during the course of the ordering of a service the delivery of which requires user information to be provided by the user.

It is preferred that the said user information is used by the user service provider 150 to automatically populate corresponding user input fields in a graphical user interface, such as the first graphical interface, provided to the user by the user service provider 150 and via the electronic device 170, 180. Hence, all or only a subset of the user information which is required by the user service provider 150 may be available from the authentication service provider for such auto population. According to one preferred embodiment, all available user information is supplied as a part of the above said authentication response. Alternatively, a separate interface is provided to the user service provider 150 by the central server 101 for querying available user information.

It is furthermore preferred that access to user information is only provided to the user service provider 150 after an explicit approval from the user in question. Such approval may be delivered for more or less general purposes in an initial step in which the user registers with the user service provider 150, the central server 101 or the authentication service provider, or at a later point. According to the preferred embodiment illustrated in FIG. 2, the user is presented, in step 223, with an option, for instance in the form of an activatable user control, in the said first graphical interface, to automatically populate input fields using available user data, or to populate only certain specified such input fields.

In case the user opts in to automatically populate input fields in the interface, the population is performed in a preferred step 224. Non-automatically populated input fields are filled in by the user manually.

Thereafter, in a step 225, the transaction identified in step 210 is performed by the user service provider 150 in relation to the user in question. This may mean the ordering or purchasing of a good or a service, involving a transfer of funds; the publication or transmittal of information; the activation of a subscription; the modification of user information; or any other conventional user service.

In step 226, the method ends.

According to a preferred embodiment, both the selected authentication service provider and the user service provider 150 are accessed by the particular user in question via a web browser provided on the electronic device 170, 180. This is also the case in a method according to a second aspect of the invention, which is illustrated in FIG. 3 and which will be described in the following. The following description of the method according to this second aspect of the invention will furthermore provide a more detailed description of certain preferred aspects of the above described method according to the first aspect of the invention.

Hence, in a step 301 the method starts.

In a step 302, which is similar to step 202, the central server 101, at least one, preferably several, preferably a plurality of, authentication service provider(s) 110, 120, 130 and at least one, preferably several, preferably a plurality of user service provider(s) 150 are provided. The central server 101 is in communication with both the authentication service provider(s) 110, 120, 130 and the user service provider (s) 150.

According to this second aspect of the present invention, the authentication service providers are arranged to authenticate users via a respective authentication web interface each. Such a web interface, of course, is an example of an interactive graphical user interface. Moreover, the user service providers are arranged to provide user services to particular users via a respective user service web interface each. Furthermore, the said web interfaces are provided to the user via one and the same web browser executed from (such as via a remotely provided web browsing service), or by, the electronic device 170, 180 belonging to the user in question. The user service web interface corresponds to the first user interface as discussed above in relation to FIG. 2.

In a preferred step 303, the said authentication web interface is provided by at least one of said authentication service providers 110, 120, 130, for instance by making available a corresponding web page by a web server comprised in said provider 110, 120, 130.

According to the second aspect of the present invention, access is provided, for a particular user and using the said web browser, to the authentication web interface of a particular one of said authentication service providers 110, 120, 130, and the user is authenticated by the particular authentication service provider in a manner which may be similar to the one described above in connection to step 204.

Upon such an authentication of the user, the authentication web interface of the particular authentication service provider is then caused to allow the central server 101 to place a cookie in the above described web browser, such as on the electronic device 170, 180 used by the particular user, which cookie identifies the particular authentication service provider to the central server 101.

In the exemplifying embodiment illustrated in FIG. 3, this involves steps 304-310.

In a step 304, the web browser of device 170, 180 requests a web page from the particular authentication service provider, a web server functionality of which in turn, in a step 305, replies with an authentication web interface page in HTML (HyperText Markup Language) code or the corresponding. This web page preferably comprises input fields for the user to fill in user credential data for transmittal to the particular authentication service provider and subsequent use for authentication of the user as described above. Hence, in a step 306, the user provides said credential data, using the web page, to the particular authentication service provider.

According to a preferred embodiment, the user is furthermore provided with an option, in a step 307 which may be similar to step 205 and which may be performed in addition to steps 304-306, to allow the particular authentication service provider to provide, to the central server 101, information regarding the authentication status of the user, and preferably also to be able to, in a subsequent step 331, provide user information to the user service provider 150 (see below). The option is preferably arranged as an integrated part of the authentication service provider web page provided in step 305, such as an activatable user control.

Figure 4A:
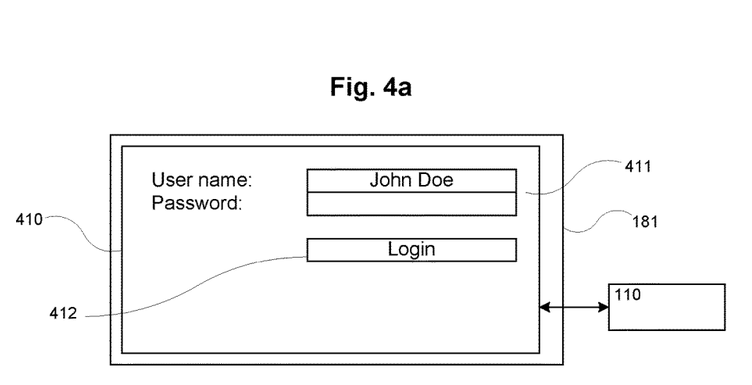
FIGS. 4a-4g show various interfaces provided by a web browser on the display of a user electronic device.

An example of such an authentication service provider web page 410 is illustrated in FIG. 4a, as provided by authentication service provider 110 and shown on the display 181 of the device 180 and hence viewable to the user. A number of user controls 411 allow the user to enter user-specific credential data for transmittal to the authentication service provider 110 upon pressing the "Login" button 412.

Figure 4B:
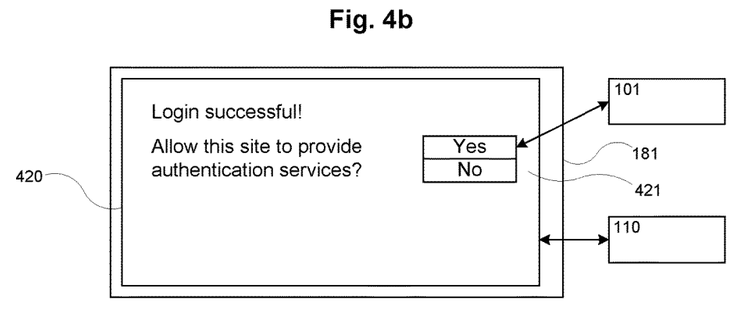

FIG. 4b illustrates an exemplifying state 420 of the web interface after the button 412 has been pressed, wherein user controls 421 (step 307) for allowing the authentication service provider 410 to be used in subsequent authentication of the user via the central server 101.

In fact, the user controls 421 represents one example of a preferred embodiment, in which central server 101 authentication content is provided, in a step 308, as a part of and comprised in a web page 410 of the authentication web interface, which content is fetched from the central server 101.

Herein, "central server authentication content" means web page content the display or activation of which requires a call, such as a redirect performed by requesting the corresponding central server 101 URL (Uniform Resource Locator), from the web browser of the device 180 to the central server 101. In the case shown in FIG. 4b, the activation of the "Yes" button in controls 421 will result in a corresponding call to the central server 101. In another preferred example, as illustrated in step 308-309 of FIG. 3, the display of central server content, which may be, for instance, invisible content such as an empty iframe, a passively displayed image or the like, or an activatable user control, etc., and which points to a web server or the like provided by the central server 101, therefore requires a redirect to be performed, in step 309, to the central server 101. In the latter case, no explicit user interaction is thus necessary for achieving the said call to the central server 101.

The central server 101 is then in turn arranged to place the cookie, in the above described web browser, such as on the electronic device 180, as a part of a response to this call or redirect from the authentication web interface requesting said central server 101 authentication content. The placing of the cookie can be performed in a way which is conventional as such. Preferably, the cookie is placed with a specified expiry time. Herein, the term "call", in this context, is intended to also encompass a redirect.

In the case illustrated in FIG. 4b, wherein the said central server 101 authentication content comprises a user control 421 activatable for allowing the authentication service provider 110 in question to provide authentication of the user in relation to user service provider(s) 150 in communication with the central server 101, the cookie is either caused to comprise information regarding whether or not such authentication has been allowed by the user and for the particular authentication service provider in question, alternatively that the cookie is not placed if the user control 421 is not activated.

In general, it is preferred that the central server 101 authentication content is comprised in a web page displayed to the user in the authentication web interface 181 in a state in which the user is authenticated, in other words wherein an active user authentication session exists. Preferably, the content is displayed as a part of a web page confirming the successful authentication of the user.

It is realized that steps 303-310 correspond to steps 204-206. In other words, the placing of the cookie by the central server 101 after being called from the authentication web interface constitutes an example of notifying the central server 101 of the performed authentication.

In a preferred step 311, similar to step 207, a template may be provided to the authentication service provider 110 from the central server 101.

Then, in a step 312 according to the second aspect of the present invention, access is provided by a particular user service provider 150, for the user and using the same web browser executed from or by the same electronic device 180 as in steps 304-310, to the above mentioned user service web interface. The web page is requested in a step 314 by the user, for instance by the user surfing to an online vendor site for the purchase of one or several products.

As a result of this provision, the cookie placed in step 310 is provided, in a step 318, to the central server 101, in a way which will be described in the following.

In particular, it is preferred that the provision of the cookie to the central server 101 takes place by the user service web interface comprising central server 101 user service content which is fetched from the central server 101, and by the central server 101 receiving the cookie as a part of a call from the user service web interface requesting said content. Herein, the term "central server user service content" is intended to have a meaning similar to that of "central server authentication content", but provided as a part of the user service web interface rather than the authentication service web interface.

Figure 4C:
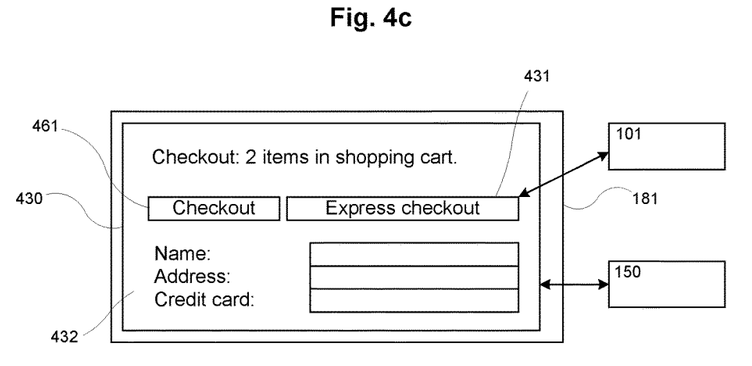

This is illustrated in FIG. 4c, showing a products checkout page 430 in the user service web interface, as displayed on the display 181 of the device 180 after being fetched from the user service provider 150. The web interface comprises user controls 432 for entering and transmitting, to the user service provider 150, user information. The button "Express checkout" 431 constitutes central server 101 user service content, in the sense that the activation of the button 431 results in a call or redirect to the central server 101, and/or in the sense that the display of the button 431 itself results in a call or redirect to the central server 101. In the latter case, such content 431 may, depending on the result of the identification described below in relation to step 319, be arranged to be automatically updated by the central server 101 to display the option presented in step 315, for instance by displaying the button 431 only when an available authentication service has been identified in step 319.

In a step 313, which is similar to step 210 and which can be performed at any time prior to step 334 but preferably prior to step 315, the transaction to be performed by the user service provider 150 is identified.

In a preferred step 315, which is similar to step 217, the user is hence presented with an option to use the central server 101 for authentication. This option is exemplified by the button 431. Again, if the user does not wish to be authenticated via the central server 101, he or she may opt out, in which case the method, in a step 316, causes the user service provider 150 to perform the authentication in its default way, which may be conventional as such and similar to step 216. In FIG. 4c, this may take place by the user filling in the user data in fields 432 and then pressing button 461 instead of button 431.

If, on the other hand, the user wishes to proceed with authentication via the central server 101, the button 431 is pressed, whereupon the method continues to a preferred step 317, in which the existence of central server 101 user service content in the user service web page 430 causes a redirect or call to the central server 101.

From the above, it is understood that the steps 313, 314, 315 and 317 can be performed in different order, depending on the detailed purposes of the method. For instance, the call in step 317 may be performed prior to step 315, by the presentation of the web content 432 requiring a call to the central server 101. Step 317 may also be performed several times for the same transaction.

As a consequence of the call to the central server 101 in step 317, the central server 101 gains access to the cookie placed in step 310 as described above, preferably as a part of the call in step 317, and the central server 101 can hence identify the authentication service provider 110 as one that is capable of authenticating the same user as is now accessing the user service web interface 430.

According to a preferred embodiment, several cookies are placed by the central sever 101 in steps similar to step 310 but in relation to authentication with different respective authentication service providers at different respective points in time. Then, in step 318, several or, preferably, all of these previously placed cookies are provided to the central server 101. This provision of available cookies previously placed by the central server 101, as a consequence of a call to the central server 101, may be conventional as such. This way, the central server gains awareness of several authentication service providers that can authenticate the user in question.

Then, in a step 319, which is similar to step 214, the authentication service provider 110 previously authenticating the user, or a preferred authentication service provider, for instance selected among several available authentication service providers as described above in connection to step 214, is identified based on the cookie(s) read in step 318.

It is preferred that the central server 101 selects one authentication service provider 110 from the several authentication service providers 110, 120, 130 as identified using the said cookies.

In case there are at least several authentication service providers 110, 120, 130 for which cookies have been placed in various runs of step 310, it is preferred that each such placed cookie comprises information making it possible for the central server 101 to identify what authentication level is available with the authentication service provider in question and for the user in question. Alternatively, the database 102 may comprise information regarding the available authentication levels of different authentication service providers and for various users, user categories, transaction types, etc.

Then, in a step 320 according to the second aspect of the method, the central server 101 is arranged to redirect the web browser of the device 180 to the authentication service provider 110 identified or selected in step 319. Hence, the redirect of the web browser to the identified authentication service provider 110 takes place in two steps: First, a redirect is performed to the central server 101, then further to the identified authentication service provider 110.

According to a preferred embodiment, the central server 101 user service content exemplified in FIG. 4c by button 431 is populated, by the central server 101, with a user control arranged to allow the user to be authenticated by any authentication service provider 110, 120, 130 or the identified authentication service provider 110, and in a way so that the activation of said user control 431 results in the redirection in step 320.

Figure 4D:
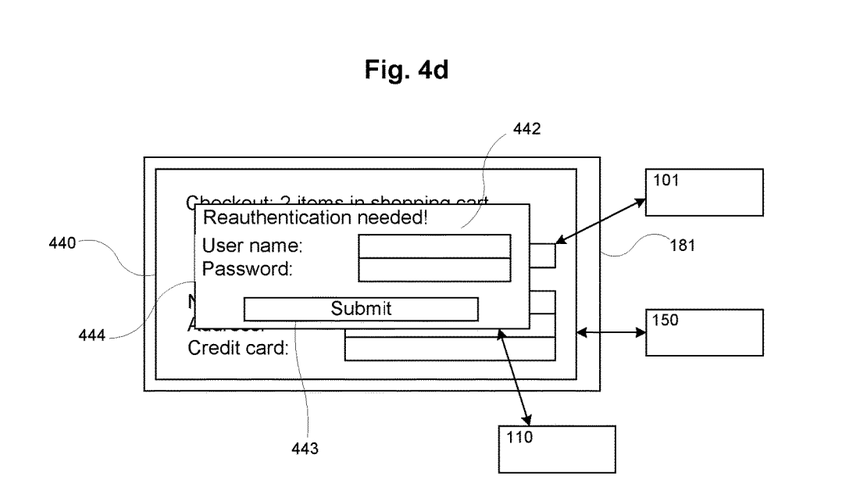

FIG. 4d illustrates the state 440 of the user service web interface according to a preferred embodiment after the pressing of button 431. Hence, the activation of the user control 431 activates a popup dialog 444, the contents of which are fetched from the central server 101. As a response to the request to the central server 101 for the contents of the popup dialog 444, the central server 101 in turn performs the redirect of step 320 to an authentication interface provided by the identified authentication service provider 110.

In a preferred step 321, which is similar to step 220, the identified authentication service provider 110 is further arranged to determine whether there is an active authentication session with respect to the user in question. This may, for instance, take place by the identified authentication service provider reading, in a way which is conventional as such, a cookie provided as a part of the redirect or call from the central server 101 to the authentication service provider in question in step 320, which cookie carries information regarding a possible such authentication session. For instance, a cookie may have been placed by the authentication service provider in question in the web browser of the device 180 as a result of the authentication performed in steps 304-308.

Hence, in case no active authentication session is detected for the user in question, the evaluation in step 322 results in the negative, and the identified authentication service provider 110 replies, in a step 323, to the central server 101 with the popup dialog 444 user controls 442, 443, in turn constituting an authentication web interface corresponding to the above discussed second interface. Using these controls 442, the user can provide credential information from the device 180, directly to the identified authentication service provider 110, by pressing the "Submit" button 443, without the central server 101 or the user service provider 150 gaining access to this information.

On the other hand, in case an active authentication session was detected for the user in question with the identified authentication service provider 110, which session has adequate properties such as fulfilling the above discussed requirements for a selected minimum allowable authentication level, an empty popup dialog 444 may be returned by the provider 110, with the result that the popup dialog 444 is never displayed to the user. Instead, the activation of the user control 431 then results in a confirmation from the identified authentication service provider 110 that such an adequate active authentication session indeed exists for the user in question.

According to yet another preferred embodiment, the central system 101 is arranged to cause the identified authentication service provider 110 to check whether the user already has an active authentication session with the identification authentication service provider 110 before displaying the popup dialog 444, in step 322 and as described above. Then, if such an active session is found to exist, the method skips directly to step 325, without displaying even an empty popup dialog. If no active authentication session is found, the user is instead presented with the second graphical user interface, in the form of popup 444, allowing, in a step 324, the user to enter user credential data to the identified authentication service provider 110 for authentication in step 325.

Hence, in a step 325 which is similar to step 221, the identified authentication service provider 110 authenticates the user, either based upon the detected existing authentication session or upon the provided credential data. In the latter case, it is preferred that a new active authentication session is opened for the user in question by the provider 110, preferably by placing a new cookie in the web browser of the device 180, with information regarding the active session in question.

Thereafter, user authentication information is provided to the user service provider 150 from the identified authentication service provider 110, preferably via the central server 101. This step is similar to step 222, but may involve several sub steps 326-331, as described in the following.

Thus, in a step 326 after the said authentication, a first access token is provided from the identified authentication service provider 110. Such an access token is arranged to allow the holder of the token to access, using the token, a certain subset of otherwise secret information from the identified authentication service provider, in particular user information (as defined above) for the user in question. Hence, using the first access token, the holder may query the identified authentication service provider 110 for at least some user information associated with the user in question and known to the provider 110. Such querying takes place via a specified interface provided by the authentication service provider 110. Suitable examples of such access tokens comprise OAuth2 access tokens.

The user service provider 150 may be provided directly with the first access token. However, it is preferred that it is the central server 101 that is provided with the first access token.

In the latter case, the central server 101 is then preferably, in turn, in a step 327 arranged to issue a second access token, preferably of similar functionality and type as the first access token, and send it to the user service provider 150, possibly indirectly by sending it to the user service web interface as operating on or from the device 180. Using the second access token, the user service provider 150, again possibly indirectly via the user service web interface, can obtain access, by querying to the central server 101 using a specified interface, to at least some user information.

Figure 4E:
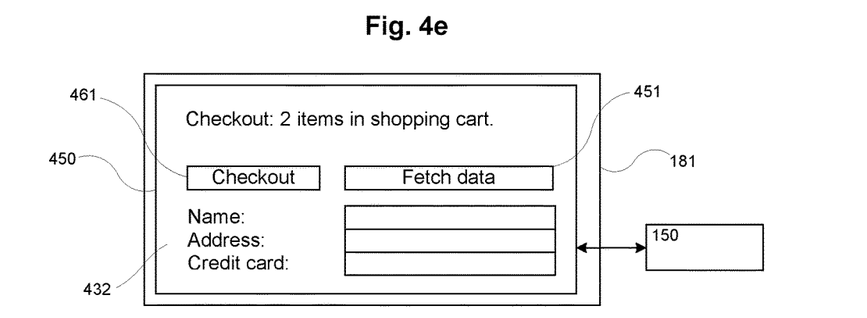

According to a preferred embodiment, the user, in a step 328, is presented with an option whereas to allow such user information to be queried from the identified authentication service provider 110, via the central server 101. This is illustrated in FIG. 4e, showing the state 450 of the user service web interface after the user has been authenticated. Instead of filling in the user information fields 432 and then pressing the button 461, the user may instead press the button "Fetch data" 451. In case the button 451 is pressed, in a step 330 the second access token is presented by the user service provider 150 to the central server 101, and used to request specified user data. Thereafter, the central server is arranged to, in a step 331, if allowed by the second access token, request user information corresponding to the information requested in step 330 from the identified authentication service provider 110.

In a step 332, the requested information, if known to the identified authentication service provider 110 and allowed by the first access token, is returned to the central server 101, which in turn is arranged to provide the information to the user service provider 150.

The issuing, provision and use of the first and second access tokens are conventional as such, and possible implementations are for instance described in the OAuth2 documentation available from http://oauth.net/2/.

Figure 4F:
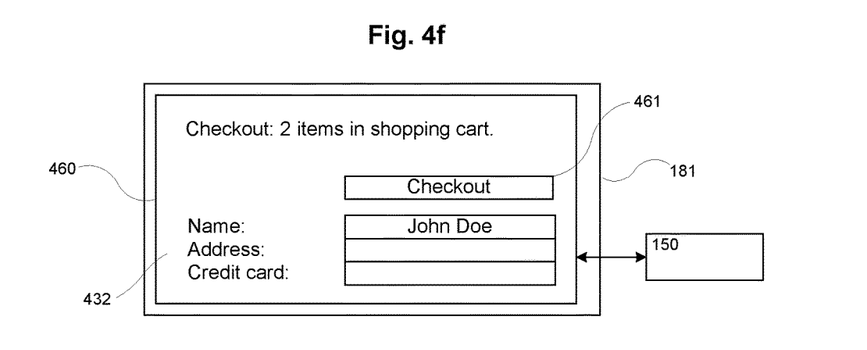

Then, in a step 333, the input fields 432 for the corresponding user information are automatically populated by the user service web interface, using the user information obtained from the central server 101 in step 332. FIG. 4*f* shows the state 460 of the user service web interface after this auto population step 333. As is clear from FIG. 4*f*, the only relevant user information available from the identified authentication service provider 110 was the name of the user ("John Doe"). However, the address and credit card information could very well have been available as well, depending on the type of authentication service provider used as the identified one.

According to a preferred embodiment, several authentication service providers 110, 120, 130 are contacted in parallel in steps 319-332, so that user information from several different sources can be provided to the user service provider 150 for automatic population of the input fields 432. The corresponding can of course also be true for step 224, above. It is in this case preferred that the option presented in step 328 covers all used authentication service providers 110, 120, 130 in only one user approval.

Then, by pressing the "Checkout" button 461, a step 334, similar to step 225, is performed, in which the transaction in question is performed by the user service provider 150 using the automatically populated user information, if any; manually entered user information, if any; and the authentication provided by the at least one identified authentication service provider 110.

Thereafter, in a step 335, the method ends.

According to a preferred variant of the above described, the step 315 is performed already before the transaction has been defined, such as before proceeding to checkout in an online vendor web site. This way, user information can be provided to the user service provider 150, via the mechanism in steps 325-332, and used for instance to provide enhanced purchasing support information to the user. This can be achieved by, for instance, a button representing the option in step 315 being displayed at the welcoming page of the user service web interface.

According to another preferred embodiment, the database 102 comprises a respective record for each user registered for use with the system 100, comprising a flag setting that the user always, or at least for a certain set of user service providers 150, wishes to accept the option presented in step 217 or 315, respectively. If the flag is set, the steps 218 or 220, or 317, respectively, are always performed, instead of 216 or 316, respectively, whenever and as soon as at least one authentication service provider 110, 120, 130 is available for valid user authentication as described above.

Figure 4G:
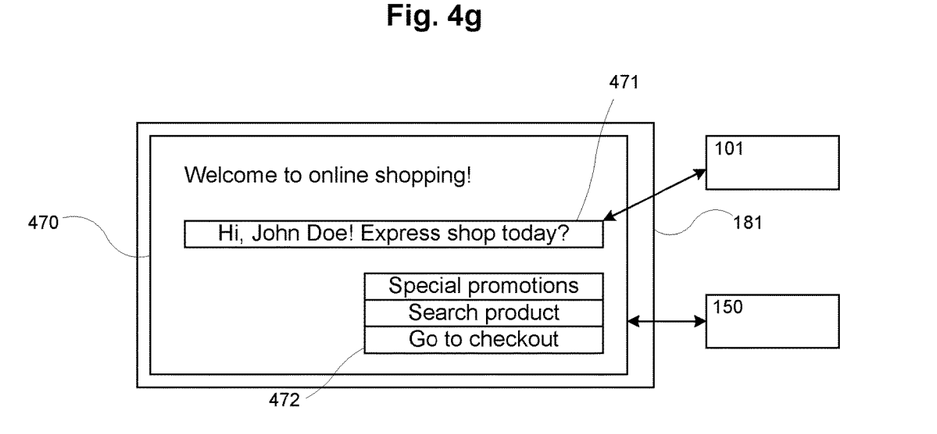

FIG. 4*g* illustrates an example of these two latter variations, in the form of the welcome page 470 of a user service web interface provided on the display 181 of the device 180 of the user John Doe, displaying user controls 472 for navigating the page. In this case, the user has agreed to always allow user service providers to gain access to the user name via the above described access tokens, as provided by the user's online community service provider. By pressing the button 471, the user agrees that the user service provider is entitled to request also other available user information from the central server 101 and, when proceeding to checkout, available user information will be used to auto populate any input fields as described above.

In fact, the button 471 will generate a redirect to the central server 101, which then receives any cookies previously stored in the web browser of the device 180 by central server authentication content by the action of authentication service providers, and then, after proper verification of the settings in the database 102 and the contents of the said cookies, redirects to the said online community service provider, which, in turn, issues and returns the above described first access token. To the user, this process is completely unnoticeable and virtually instantaneous, since the user in this exemplifying case already has an active authentication session with the said online community provider.

A method and a system according to the present invention provides a cost-efficient way for a user service provider 150 to be able to offer secure authentication of its users. By registering with the central server 101 and specifying at least one minimum allowable authentication level, such a user service provider 150 gains access to a network of third party authentication service providers 110, 120, 130 that can provide required user authentication on behalf of the user service provider. Since each user authentication service provider can offer to sell such an authentication for a particular price, using good economies of scale, the central server 101 can provide complex and advanced user authentication at a very cost-efficient total cost per authentication than, for instance, a small-scale user service provider 101 is capable of reaching. It is even possible for such a small-scale user service provider to offer a wide and highly specialized set of authentication service functionality without its total costs for authentication increasing significantly.

On the other side, users of the system 100 can authenticate themselves to a wide range of user service providers 150 in a very efficient manner, and also have the system 100 keep track of relevant user information such as credit card numbers, without jeopardizing personal information integrity, by simply agreeing to letting one or several trusted authentication service providers, such as the user's personal online banking facility, authenticate the user on behalf of other parties and to contribute with user information known to them.

Importantly, these advantages can be achieved without removing much flexibility for any of the stakeholders. The users can choose to use any registered authentication service provider, and the user service providers do not have to follow authentication standards or protocols offered by the individual authentication service providers.

Furthermore, users will experience better efficacy when dealing with user service providers, since much user information can be made available automatically, without the user having to type it in repeatedly at various sites. At the same time, user service providers can offer a more tailor made user experience with extra knowledge of the visiting user at an early point in the transaction process. These advantages are even more powerful in case several authentication service providers are used in parallel to together provide a more complete set of available user information.

According to a further preferred embodiment, the selected or identified authentication service provider described above is a mobile telephony operator to which the particular user is a subscriber. In this case, the user authentication provided by such authentication service provider comprises a mobile authentication step in which the user communicates with the selected authentication service provider using a mobile device comprising a SIM card associated with the particular user's subscription with the said authentication service provider. For instance, the credential data provided by the user to the authentication service provider may then comprise an alphanumeric code sent to the telephone number (MSISDN) of the mobile phone as an SMS, read by the user and input into an input box comprised in the graphical interface. The above described first graphical interface may be provided on the display of the said mobile telephone, such as by a web browser running on the mobile telephone. Such method provides a second authentication factor (something the user has, namely the mobile telephone).

It is particularly preferred that the mobile authentication step specifically comprises the verification of a certificate which has previously been provided on the said SIM card. This provides very good security.

In case the first graphical interface is provided by a mobile telephone, it is preferred that the selection or identification, by the central server, of which authentication service provider to use for user authentication comprises to first investigate whether the user's mobile operator is registered with the central server 101 for user authentication, and available for authenticating the particular user in question at the current moment. This investigation is preferably performed by consulting data stored in the database 102. If this is not the case, the availability of other authentication service providers are investigated.

In another preferred embodiment, the said user credential data comprises information identifying a wireless or wired local internet access network, such as a WiFi or LAN network, to which the electronic device is locally connected, preferably such a network which is associated with a certain limited geographical coverage area so that a device being registered on the network in question is also located in the said coverage area unless the network registration is fraudulently achieved. This can be achieved in different ways. In a first example, the said network itself is identified using said user credential data, read off automatically by the connected device and sent to the central server 101. In a second example, a particular SIM card used for providing wireless internet connectivity to the electronic device, such as a SIM card in the device itself or a SIM card in a mobile phone used to create a WiFi network to which the device is locally connected, is identified using the credential information and provided to the central server 101. Then, the central server 101 is arranged to compare the provided network- or SIM card identifying information to a predetermined, assumed network or SIM card to which the user should be connected if authentic.

Above, a number of preferred embodiments have been described. However, it is apparent to the skilled person that many modifications can be made to the described embodiments without departing from the basic idea of the invention.

For instance, the above described first and second aspects of the present invention represent two different ways of achieving similar goals. These two aspects have considerable overlap, many of which have been pointed out in the above description. However, it is realized that all features from one of these can be freely applied to the other, and vice versa, when so is practically applicable.

Moreover, one or several of the authentication service providers may be comprised by respective external central servers similar to the central server 101. Such external central servers will then, typically, be connected to a respective plurality of other authentication service providers. Then, such external central servers are treated as ordinary authentication service providers. So, for instance in the above described auction procedure, an external central server may provide a sell price for authentication of a user in a certain current situation and under certain conditions, using its own network of available authentication service providers. Such a setup may for instance be advantageous to facilitate geographic coverage of the system 100 in several countries or regions.

Hence, the invention is not to be considered limited to the described embodiments, but may be varied within the scope of the enclosed claims.

The invention claimed is:

1. Method for authenticating a user, comprising the steps of:
   a) providing a central server, in communication with at least two authentication service providers and at least one user service provider;
   b) associating each authentication service provider with at least one respective available level of authentication;
   c) receiving, at the central server, a request from the user service provider to authenticate a particular user accessing the user service provider via an electronic device;
   d) identifying a minimum level of authentication to use for the said request;
   e) causing the central server to identify a selected one of said authentication service providers which is associated with at least one allowable level of authentication which is at least as high as the said minimum level of authentication, and which selected authentication service provider is configured to authenticating said particular user at said allowable level of authentication;
   f) either providing user credential data associated with said particular user directly to the selected authentication service provider, without said user credential data being supplied to the central server, or determining that the selected authentication service provider has an active authentication session for the particular user; and
   g) causing the selected authentication service provider to authenticate the particular user and to provide an authentication response,
   wherein step g) further comprises providing access, to the user service provider, to user information previously stored and associated with the particular user with the selected authentication service provider, by step g) comprising the selected authentication service provider being caused to provide a first access token, using which the said user information is accessed from the authentication service provider, to the central server, and by step g) further comprises the central server being caused to provide, to the user service provider, a second access token using which the user service provider can request the central server to provide information regarding the user, and, upon such request using the second access token, the central server being caused to query, using the first access token, the selected authentication service provider for said user information and provide the user information to the user service provider.

2. Method according to claim 1, wherein the particular user accesses the user service provider remotely via a first graphical user interface provided on a display of the electronic device, and wherein the first graphical user interface is arranged to in turn activate a second user interface which is arranged to allow the particular user to communicate directly with the selected authentication service provider, thereby to supply said user credential data.

3. Method according to claim 2, wherein the second user interface is a graphical user interface provided to the user on the electronic device.

4. Method according to claim 3, wherein the second graphical user interface is provided as an integrated graphical sub interface of the first graphical user interface, such as within a specific iframe provided within a web page comprised in the first graphical user interface.

5. Method according to claim 4, wherein the central server provides a template for the said second graphical user interface to the selected authentication service provider, and wherein the selected authentication service provider provides the actual second graphical user interface to the user service provider, for provision to the particular user as a part of the first graphical user interface, based upon said template.

6. Method according to claim 1, wherein the authentication service providers are caused to be remotely configurable by individual users to provide information regarding the capability of authentication of the users in question to the central server.

7. Method according to claim 6, wherein the authentication service providers notify the central server when a user has been authenticated by the authentication service provider in question.

8. Method according to claim 1, wherein the steps f) and g) are only performed if the identification in step e) succeeds in identifying at least one capable authentication service provider, and, in case the identification in step e) does not succeed, the user service provider is instead caused to authenticate the particular user without involving any of said authentication service providers.

9. Method according to claim 8, wherein the identification in step e) is first performed, and wherein, only if said identification succeeds, the particular user is presented with an option, via a graphical user interface, to authenticate using said authenticating service providers.

10. Method according to claim 1, wherein the respective at least one level of authentication used in step e) for each authentication service provider is caused to depend on at least one of the collection of parameters consisting of type of the electronic device; type and/or provider of a graphical user interface via which the user accesses the user service provider; the access of the authentication service provider in question to information identifying the particular user; geographical location of the electronic device; and/or the existence of an active authentication session with the authentication service provider in question.

11. Method according to claim 10, wherein the selected authentication service provider is a mobile telephony operator to which the particular user is a subscriber, and wherein step g) comprises a mobile authentication step in which the user communicates with the selected authentication service provider using a mobile device comprising a SIM card associated with the particular user's subscription with the selected authentication service provider.

12. Method according to claim 1, wherein the user credential data comprises information identifying a wireless or wired local internet access network to which the electronic device is connected, either in the sense that the network itself is identified using said information or in the sense that a particular SIM card used for providing wireless internet connectivity to the electronic device is identified using said information.

13. Method according to claim 1, wherein said user information is used to automatically populate corresponding user input fields in a graphical user interface provided to the particular user by the user service provider and via the electronic device.

14. Method according to claim 1, wherein said access to user information is only provided after an explicit approval from the particular user.

15. Method according to claim 1, wherein both the selected authentication service provider and the user service provider are accessed by the particular user via a web browser provided on the electronic device.

16. Method according to claim 1, wherein step e) comprises the central server identifying, for several authentication service providers, a respective offered sell price for performing user authentication at the respective allowable level of authentication, and the central server further identifying an authentication service provider offering a lowest sell price at the respective allowable level and using this as the selected authentication service provider.

17. System for authenticating a user, wherein the system comprises a central server comprising a processor and a memory, in communication with at least two authentication service providers and at least one user service provider, wherein the system further comprises a database comprising respective associations between each authentication service provider and at least one respective available level of authentication, wherein the central server is arranged to receive a request from the user service provider to authenticate a particular user accessing the user service provider via an electronic device, to identify a minimum level of authentication to use for the said request and to identify a selected one of said authentication service providers which is associated with at least one allowable level of authentication which is at least as high as the said minimum level of authentication, and which selected authentication service provider is configured to authenticating said particular user at said allowable level of authentication, wherein the system is arranged to thereafter either provide user credential data associated with said particular user directly from the user service provider to the selected authentication service provider, without said user credential data being supplied to the central server, or to determine that the selected authentication service provider has an active authentication session for the particular user, and wherein the system is arranged to cause the selected authentication service provider to authenticate the particular user and to provide an authentication response to the user service provider, wherein the system is further arranged to thereafter provide access, to the user service provider, to user information previously stored and associated with the particular user with the selected authentication service provider, by the central server being arranged to receive, from the selected authentication service provider, a first access token, using which said user information is accessed from the authentication service provider, by the central server further being arranged to provide, to the user service provider, a second access token using which the user service provider can request the central server to provide information regarding the user, and by the central server being arranged to, upon such request using the second access token, query, using the first access token, the selected authentication service provider for said user information and provide the user information to the user service provider.

* * * * *